(12) United States Patent
Huang et al.

(10) Patent No.: US 8,020,052 B2
(45) Date of Patent: Sep. 13, 2011

(54) FAULT ANALYSIS RESULT GENERATING SYSTEM AND METHOD

(75) Inventors: Chung-Chi Huang, Taipei Hsien (TW); Guang-Dong Yuan, Shenzhen (TW); De-Sheng Qiu, Shenzhen (TW); Xun-Chun Qiu, Shenzhen (TW); Xiang Wang, Shenzhen (TW); Rong Hu, Shenzhen (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/715,534

(22) Filed: Mar. 2, 2010

(65) Prior Publication Data
US 2011/0131454 A1  Jun. 2, 2011

(30) Foreign Application Priority Data
Dec. 1, 2009 (CN) .......................... 2009 1 0310730

(51) Int. Cl.
*G06F 11/00* (2006.01)

(52) U.S. Cl. .............................. 714/57; 714/26; 714/37

(58) Field of Classification Search .................... 714/26, 714/57
See application file for complete search history.

(56) References Cited

U.S. PATENT DOCUMENTS

| | | | | |
|---|---|---|---|---|
| 5,852,819 A * | 12/1998 | Beller | .................. | 1/1 |
| 2003/0177201 A1* | 9/2003 | Shen | .............................. | 709/218 |
| 2004/0153822 A1* | 8/2004 | Arcand et al. | ................... | 714/38 |
| 2004/0187048 A1* | 9/2004 | Angamuthu et al. | ........... | 714/27 |
| 2006/0174170 A1* | 8/2006 | Garland et al. | .................. | 714/57 |
| 2007/0277090 A1* | 11/2007 | Raja et al. | ....................... | 715/503 |
| 2008/0155356 A1* | 6/2008 | Boskovic et al. | ................ | 714/45 |
| 2009/0094324 A1* | 4/2009 | Le Chevalier | ................ | 709/203 |
| 2010/0082587 A1* | 4/2010 | Hattori | ........................... | 707/706 |
| 2010/0161503 A1* | 6/2010 | Foster | ........................... | 705/321 |
| 2010/0250453 A1* | 9/2010 | Kawai et al. | ................... | 705/305 |

* cited by examiner

*Primary Examiner* — Robert Beausoliel, Jr.
*Assistant Examiner* — Joshua P Lottich
(74) *Attorney, Agent, or Firm* — Altis Law Group, Inc.

(57) ABSTRACT

A fault analysis result generating system includes an extracting unit, a converting unit, a determining unit, and a result generating unit. The system extracts fault analysis files, converts the fault analysis files to a first predetermined file format which is easy to be processed, converts the fault analysis files with the first predetermined file format to a second predetermined file format, and then transfers the fault analysis files with the second predetermined file format to a learning sharing module.

10 Claims, 2 Drawing Sheets

FAULT ANALYSIS RESULT GENERATING SYSTEM AND METHOD

BACKGROUND

1. Technical Field

The present disclosure relates to result generating systems and methods, and particularly, to a result generating system and method for generating fault analysis results of electronic devices.

2. Description of Related Art

The detection and diagnosis of malfunctions in technical systems may be called fault analysis. A fault analysis system is a system involving a computer which monitors an electronic device to signal a malfunction, determine the components of the electronic device responsible for the malfunction and generated fault analysis results. Engineers can improve the electronic device according to those fault results. However, those fault results may not be effectively processed, thus requiring more tests to be generated, making this is very inconvenient.

DETAILED DESCRIPTION

Figure 1:
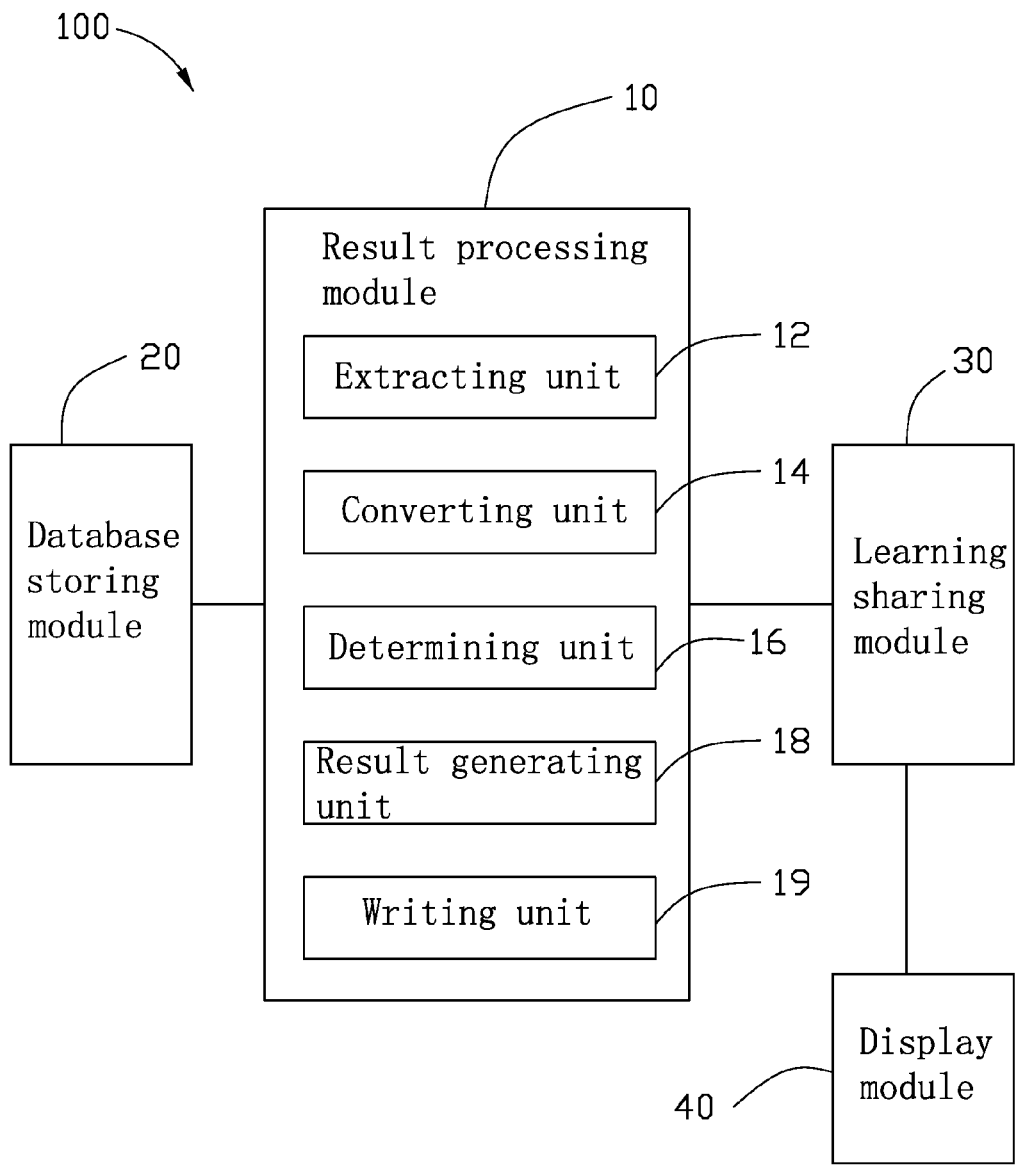
FIG. 1 is a block diagram of an exemplary embodiment of a fault analysis result generating system.

Referring to FIG. 1, an embodiment of a fault analysis result generating system includes a result processing module 10, a database storing module 20, a learning sharing module 30, and a display module 40.

The result processing module 10 can generate fault files. The database storing module 20 can store all reference data processed by the engineers. The learning sharing module 30 can collect the fault files and some special files defined by the engineers. The display module 40 can display information collected by the learning sharing module 30. The result processing module 10 may be a computer. The database storing module 20 and the learning sharing module 30 may be storage devices, such as disk drives. In other embodiments, the database storing module 20 can be omitted for cost efficiency.

The result processing module 10 includes an extracting unit 12, a converting unit 14, a determining unit 16, a result generating unit 18, and a writing unit 19.

The extracting unit 12 can extract fault files according to recorded results from the engineers stored in the database storing module 20. The fault files may include many file formats, such as an Excel file format, which can be selected by different engineers. The recorded results are all original data recorded by the engineers from all result-processing processes, which may include the device's parameter data, the device's pictures, some standards required by clients, and so on. Those recorded results can help engineers find reasons for the malfunctions.

The converting unit 14 can convert the fault files to a first predetermined file format, such as a web format, to unify fault files which have different file formats into one file format. The first predetermined file format would be very easy to manage in data processing processes.

The determining unit 16 can determine whether the fault files are in the first predetermined file format. If the fault files are not in the first predetermined file format, the extracting unit 12 extracts fault files repeatedly. If the fault files are in the first predetermined file format, the determining unit 16 outputs a control signal to the result generating unit 18.

The result generating unit 18 can convert fault files from the first predetermined file format to a second predetermined file format, such as a word document format, for easy reading, when the result generating unit 18 receives the control signal. The result generating unit 18 can also transfer the fault files from the second predetermined file format to the learning sharing module 30. The second predetermined file format would be very easy to read after the data processing processes.

The writing unit 19 can transfer special files defined by engineers to the learning sharing module 30. The special files cannot be converted to the first predetermined file, such as basic input/output system files, firmware files, and so on.

Figure 2:
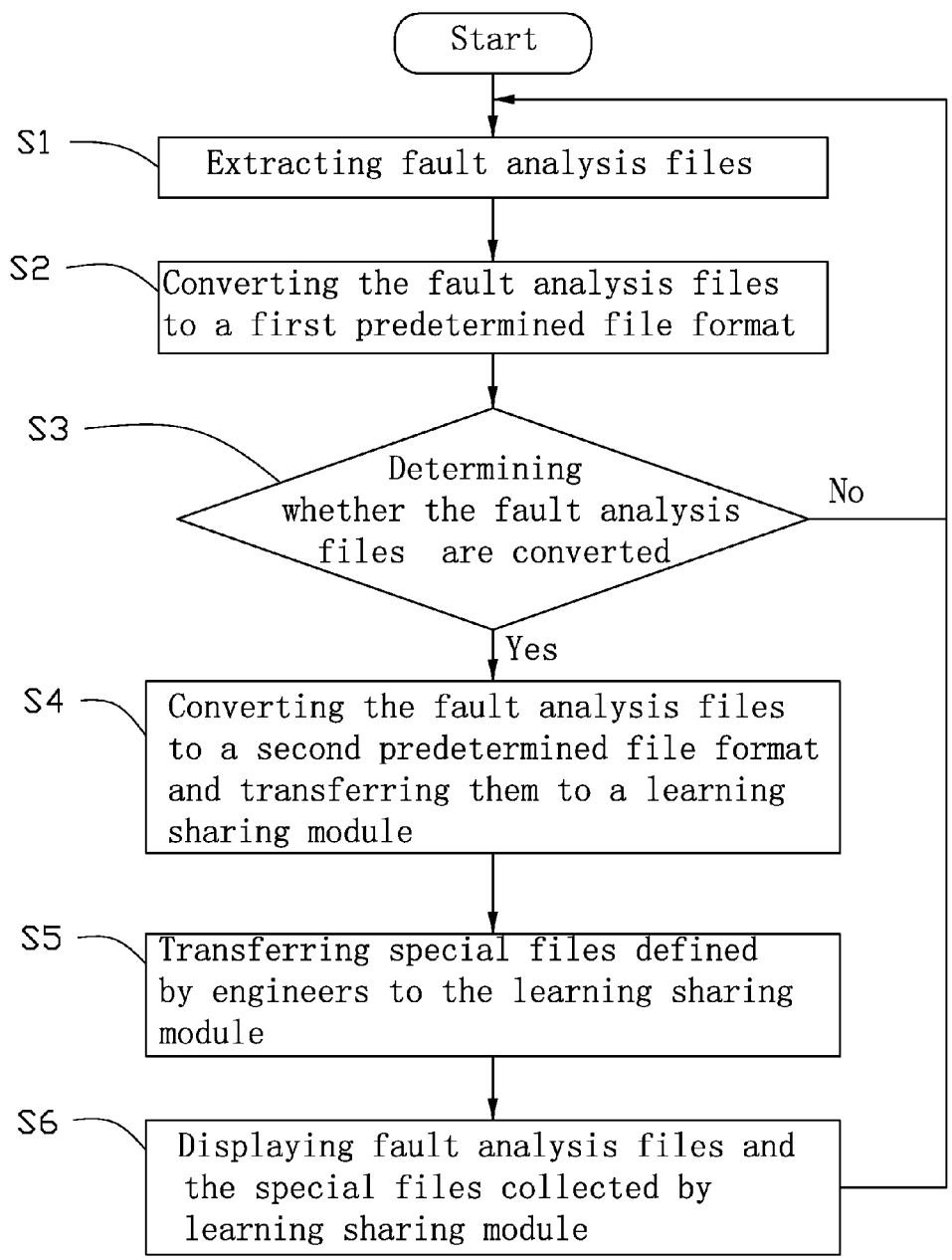
FIG. 2 is a flowchart of an exemplary embodiment of a fault analysis result generating method.

Referring to FIG. 2, an embodiment of a fault analysis result generating method includes the following steps.

In step S1, the extracting unit 12 extracts fault files according to the prerecorded results from the engineers stored in the database storing module 20.

In step S2, the converting unit 14 converts the fault files to the first predetermined file format. In other embodiments, the fault files are not converted if already in the first predetermined file format.

In step S3, the determining unit 16 determines if the fault files are in the first predetermined file format. If the fault files are not in the first predetermined file format, the process goes back to step S1. If the fault files are in or have been converted to the first predetermined file format, the determining unit 16 outputs the control signal to the result generating unit 18, and the process goes to step S4.

In step S4, the result generating unit 18 converts the fault files with the first predetermined file format to a second predetermined file format according to the control signal, and transfers the fault files with the second predetermined file format to the learning sharing module 30.

In step S5, the writing unit 19 transfers the special files defined by engineers to the learning sharing module 30.

In step S6, the display module 40 displays the fault files with the second predetermined file format and the special files collected by the learning sharing module 30, and goes back to step S1. The process is finished when engineers close the fault analysis result generating system.

Thus, the fault analysis result generating system and method can process the fault files effectively and read these fault files easily.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fault analysis result generating system comprising a result processing apparatus, a database storing module and a learning sharing module, wherein the result processing apparatus comprises:

a processor;

an extracting unit to extract fault analysis files according to recorded results stored in the database storing module;

a converting unit to convert the fault analysis files to a first predetermined file format;

a determining unit to determine whether the fault analysis files are converted to the first predetermined file format;

wherein the extracting unit extracts fault analysis files repeatedly in response to the fault analysis files being not converted to the first predetermined file format; the determining unit outputs a control signal in response to the fault analysis files having been converted to the first predetermined file format; and a result generating unit to convert the fault analysis files with the first predetermined file format to a second predetermined file format according to the control signal, and transfer the fault analysis files with the second predetermined file format to the learning sharing module.

2. The fault analysis result generating system of claim 1, wherein the result processing apparatus further includes a writing unit to transfer special files collected by the learning sharing module.

3. The fault analysis result generating system of claim 1, wherein the first predetermined file format is a web format, and the second predetermined file format is a word document format.

4. The fault analysis result generating system of claim 3, wherein the result processing apparatus further includes a display module to display the fault analysis files with the second predetermined file format and the special files collected by the learning sharing module.

5. The fault analysis result generating system of claim 1, wherein the special files are basic input output system files or firmware files.

6. A fault analysis result generating method comprising:

extracting fault analysis files according to recorded results stored in a database storing module;

converting the fault analysis files to a first predetermined file format;

determining whether the fault analysis files are converted to the first predetermined file format, extracting fault analysis files repeatedly in response to the fault analysis files being not converted to the first predetermined file format, outputting a control signal in response to the fault analysis files having been converted to the first predetermined file format;

converting the fault analysis files with the first predetermined file format to a second predetermined file format according to the control signal, and transferring the fault analysis files with the second predetermined file format to a learning sharing module; and transferring special files defined by engineers to the learning sharing module.

7. The fault analysis result generating method of claim 6, further comprising:

displaying the fault analysis files with the second predetermined file format and the special files collected by the learning sharing module.

8. The fault analysis result generating method of claim 6, wherein the first predetermined file format is a web format, the second predetermined file format is a word document format.

9. The fault analysis result generating method of claim 6, wherein the special files are basic input output system files or firmware files.

10. A result processing apparatus comprising:

a processor;

an extracting unit to extract fault analysis files according to recorded results stored in a database storing module;

a converting unit to convert the fault analysis files to a first predetermined file format;

a determining unit to determine whether the fault analysis files are converted to the first predetermined file format; wherein the extracting unit extracts fault analysis files repeatedly in response to the fault analysis files being not converted to the first predetermined file format; the determining unit outputs a control signal in response to the fault analysis files having been converted to the first predetermined file format; and a result generating unit to convert the fault analysis files with the first predetermined file format to a second predetermined file format according to the control signal, and transfer the fault analysis files with the second predetermined file format to a learning sharing module.

* * * * *